UNITED STATES PATENT OFFICE.

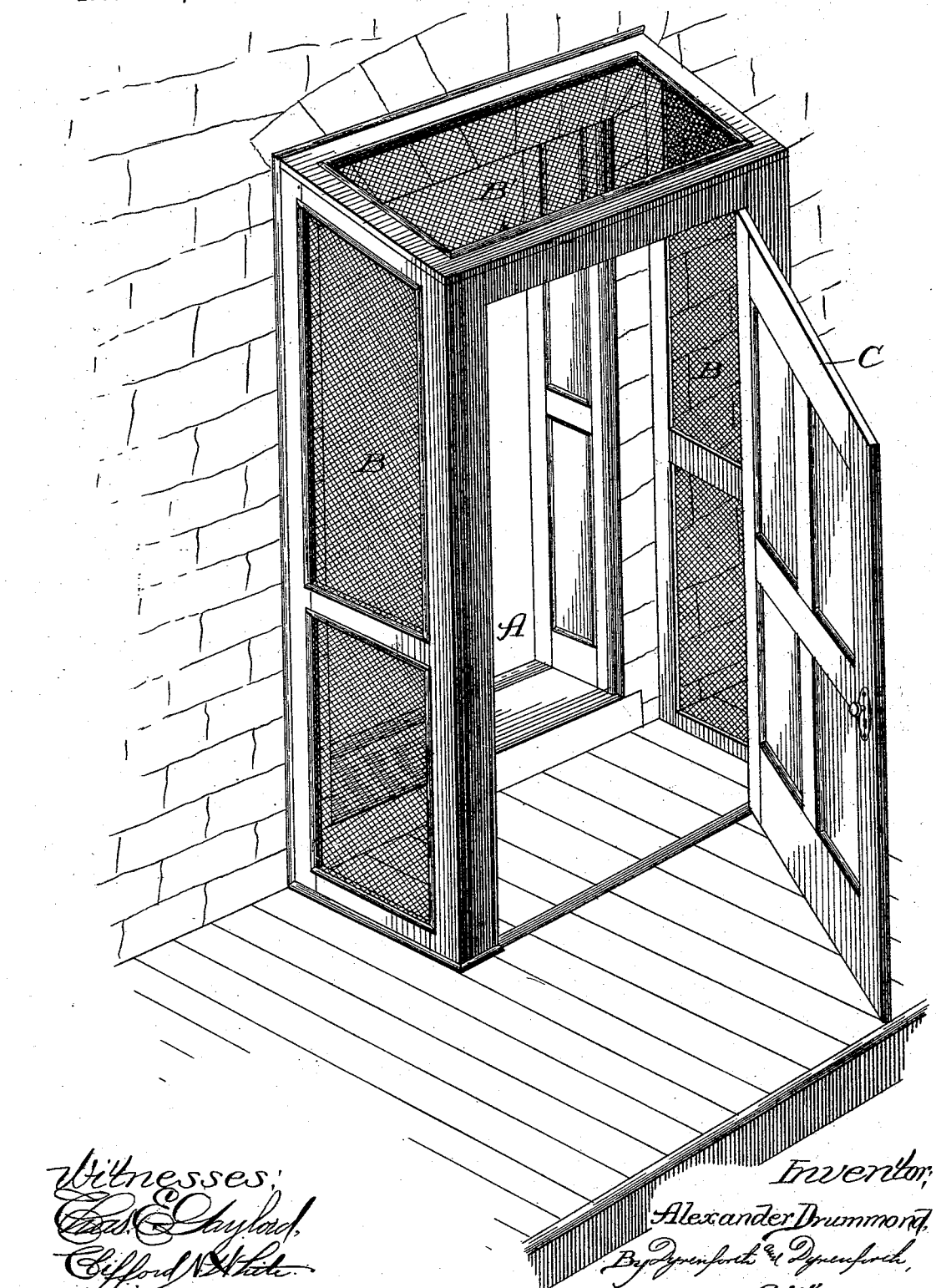

ALEXANDER DRUMMOND, OF SOUTH EVANSTON, ILLINOIS.

SCREEN-DOOR.

SPECIFICATION forming part of Letters Patent No. 498,508, dated May 30, 1893.

Application filed October 22, 1892. Serial No. 449,637. (No model.)

*To all whom it may concern:*

Be it known that I, ALEXANDER DRUMMOND, a citizen of the United States, residing at South Evanston, in the county of Cook and State of Illinois, have invented a new and useful Improvement in Screen-Doors, of which the following is a specification.

Ordinarily the screening of a door-way is accomplished by means of an open-work or wire-screen door hung to swing in the sill of the permanent or solid door to serve, when closed, as a barrier against the ingress of insects into the room while the permanent or solid door is open for purposes of ventilation. This form of screen-door is objectionable because, as flies and other insects seek a draft and find it on the open-work door, through which there is a circulation of air, they light and accumulate on the outer surface of the screen-work; and whenever the door is opened they fly off, but, being convenient to the room, seem to follow the draft and immediately proceed to enter. Thus each opening of the screen-door is liable to be accompanied by an influx of insects, particularly flies and mosquitoes, into the room. To prevent the objectionable consequence thus described I provide screen-sides extending out from opposite sides of the door-way and connect or close them overhead by a solid or screen roofing (preferably the latter); and in the species of screen-work outer vestibule thus formed, I provide a solid, or substantially, or relatively, solid door. Thus draft is produced through the open-work sides, which causes insects to light on their outer surfaces, where they are not likely to be disturbed by opening the solid door of the screening, on which door there is not the inducement for them to light; and even if they are caused to fly by opening the door, they are not in position to be drawn through the door-opening into, or to enter, the room.

The accompanying drawing shows my improvement by a perspective view.

A is the door-way which may or may not be provided with a door. From the opposite sides of the door-way I extend, at right-angles, the screened frames or screens B, B, connected overhead by a roof B', preferably also in the form of a screened frame or screen, though it may be solid. In the entrance between the sides B is a solid door C, which may be of usual or any suitable construction. The sides B being open, and the draft being through them, flies and other insects will light on their outer surfaces, and will not be induced to light on the door C, because of its being solid, so that opening it will not, as with the usual construction of screen-doors, induce the influx of insects against which the room is to be guarded.

What I claim as new, and desire to secure by Letters Patent, is—

1. In combination with a door-way A, screen-sides B extending outward from the sides of the door-way and provided with an overhead covering, and a door C hinged to one of said sides and adapted to be swung on its hinges to open and close the passage between the sides, substantially as and for the purpose set forth.

2. In combination with a door-way A, screen-sides B extending outward from the sides of the door-way and provided with an overhead screen-covering B', and a solid door C hinged to one of said sides and adapted to be swung on its hinges to open and close the passage between the sides, substantially as and for the purpose set forth.

ALEXANDER DRUMMOND.

In presence of—
M. J. FROST,
W. N. WILLIAMS.